(12) United States Patent
Nath et al.

(10) Patent No.: US 7,049,947 B2
(45) Date of Patent: May 23, 2006

(54) SYSTEM AND METHOD FOR MONITORING THE OPERATIONAL CONDITION OF A MOTOR VEHICLE

(75) Inventors: Sanjeev Nath, New York, NY (US); Rajesh Patel, Rocky Hill, CT (US)

(73) Assignee: Nattel Group, Inc., New York, NY (US)

( * ) Notice: Subject to any disclaimer, the term of this patent is extended or adjusted under 35 U.S.C. 154(b) by 0 days.

(21) Appl. No.: 10/801,311

(22) Filed: Mar. 16, 2004

(65) Prior Publication Data

US 2005/0068185 A1     Mar. 31, 2005

Related U.S. Application Data

(63) Continuation-in-part of application No. 10/673,725, filed on Sep. 29, 2003, and a continuation-in-part of application No. 10/746,465, filed on Dec. 24, 2003.

(51) Int. Cl.
*B60Q 1/00* (2006.01)
(52) U.S. Cl. ............... 340/439; 340/575; 340/576; 180/272
(58) Field of Classification Search .......... 340/439, 340/575, 576; 180/272
See application file for complete search history.

(56) References Cited

U.S. PATENT DOCUMENTS

| | | | |
|---|---|---|---|
| 5,620,436 A | 4/1997 | Lang et al. | |
| 5,632,742 A | 5/1997 | Frey et al. | |
| 5,795,306 A * | 8/1998 | Shimotani et al. | 600/558 |
| 5,931,254 A * | 8/1999 | Loraas et al. | 180/272 |
| 6,091,334 A * | 7/2000 | Galiana et al. | 340/576 |
| 6,097,295 A * | 8/2000 | Griesinger et al. | 340/576 |
| 6,179,422 B1 | 1/2001 | Lai | |
| 6,575,902 B1 * | 6/2003 | Burton | 600/300 |
| 6,580,973 B1 | 6/2003 | Leivian et al. | |
| 2002/0120371 A1 * | 8/2002 | Leivian et al. | 701/1 |

OTHER PUBLICATIONS

U.S. Appl. No. 10/673,725, filed Sep. 29, 2003, Nath et al.
U.S. Appl. No. 10/746,465, filed Dec. 24, 2003, Nath et al.

* cited by examiner

*Primary Examiner*—Thomas J. Mullen, Jr.
*Assistant Examiner*—Samuel J Walk
(74) *Attorney, Agent, or Firm*—Kelley Drye & Warren LLP

(57) ABSTRACT

A system and method for monitoring the operational condition of a motor vehicle using a silhouette and pupil defining device combined with a capability to analyze and track any changes of the operator's silhouette and of the size, shape and location of the operator's pupils within a defined zone in the motor vehicle.

20 Claims, 5 Drawing Sheets

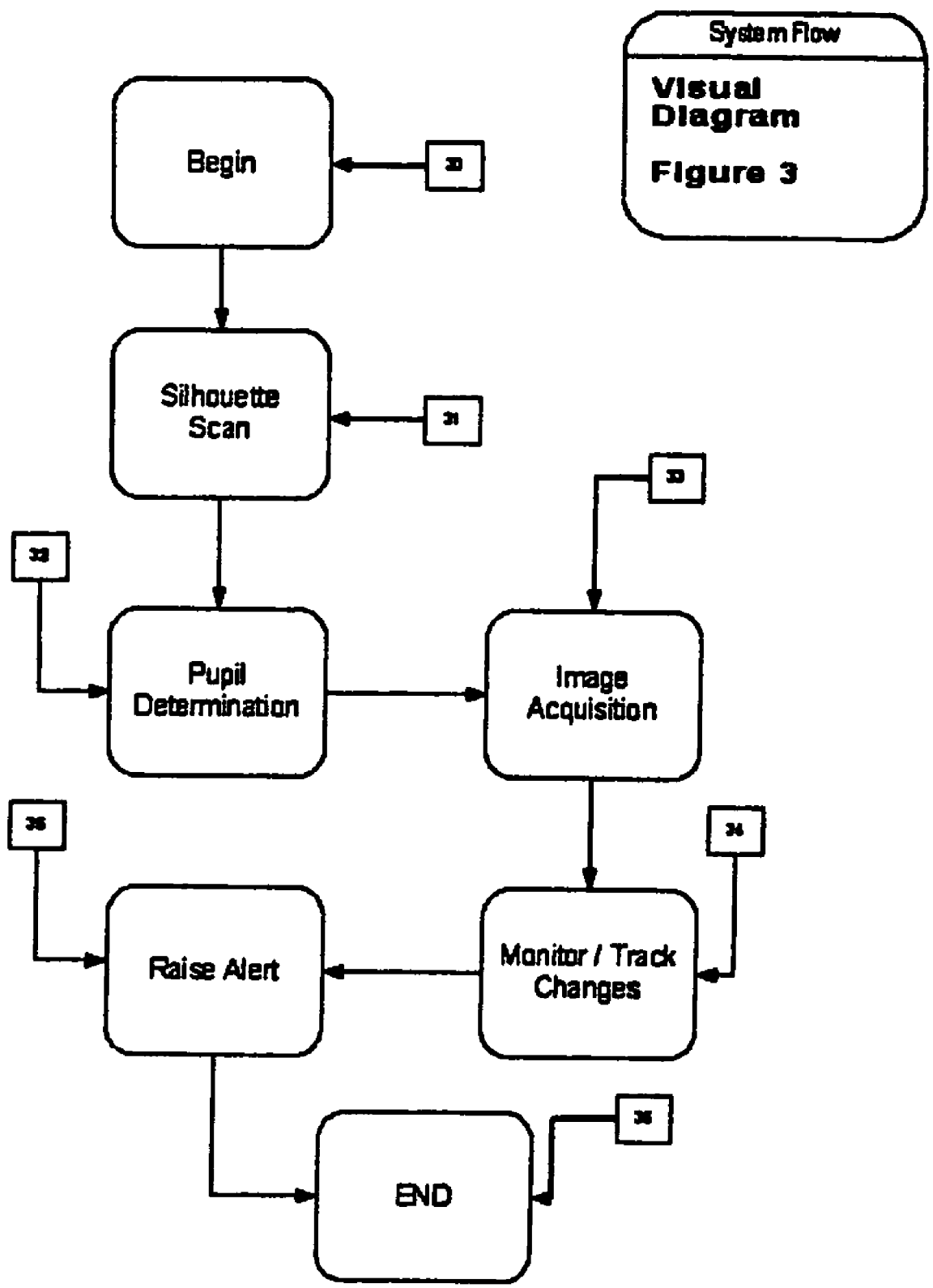

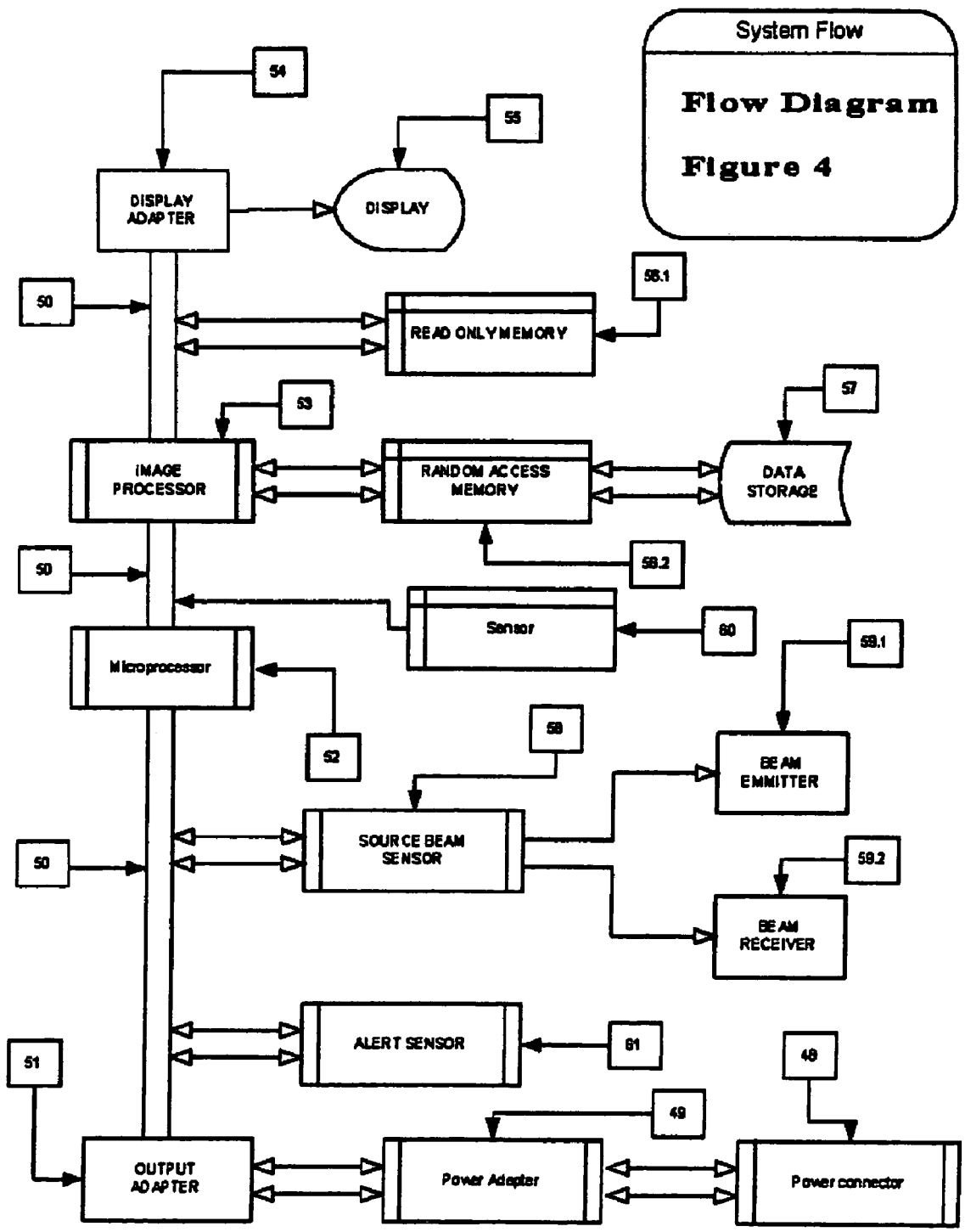

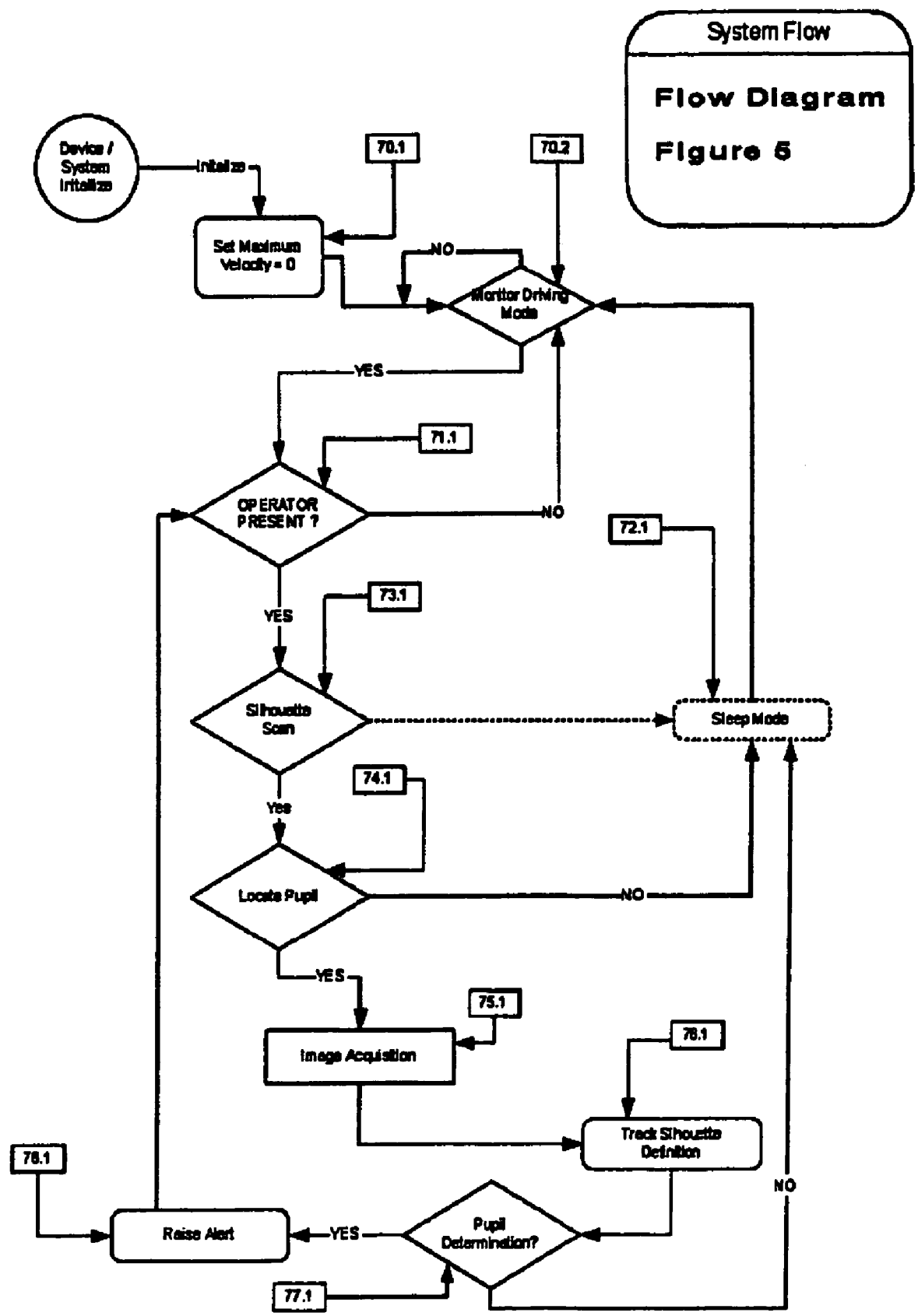

SYSTEM AND METHOD FOR MONITORING THE OPERATIONAL CONDITION OF A MOTOR VEHICLE

RELATED APPLICATIONS

This application is a continuation-in-part application of co-pending U.S. patent application Ser. No. 10/673,725, filed Sep. 29, 2003, and co-pending U.S. patent application Ser. No. 10/746,465, filed Dec. 24, 2003, from which priority is asserted, and the disclosures of which are herein incorporated by reference in their entirety.

BACKGROUND

1. Field of Invention

The present invention relates to a system and method for automated position monitoring and tracking of an object by optical and mechanical means; in particular, scanning an object within a defined zone and utilizing computer-based image processing on a real time basis.

2. Discussion of Prior Art

Monitoring and tracking a laterally moving object is important in many applications. In certain applications, it is desirable to have a tracking device not only to locate the position of the object but also to monitor the movement of the object without any significant delay of information.

For example, many eye-tracking devices have been recently developed for eye surgery with lasers, in particular, for photo-refractive surgery. A typical photo-refractive surgery scans a UV laser beam on the surface of the cornea to sculpt the profile of the corneal outer surface, one layer at a time. In U.S. Pat. No. 6,179,422, a tracking device is described that employs two scanning beams to scan across a reference mark affixed on the object to be tracked.

U.S. Pat. No. 5,620,436 discloses the use of a video camera to monitor the eye movements and to determine the position of an aiming beam on the eye. U.S. Pat. No. 5,632,742 utilizes four projecting laser spots on the eye and uses a set of peak-and-hold circuits to determine the position of the eye. In these designs, a ring shaped reference is used for determining the eye position, and spatial stationary infrared beams are applied to illuminate the reference. Sophisticated imaging systems and electronics, such as a CCD camera or four peak-and-hold circuits, are implemented to determine the position of the reference. The ring shape reference area are practically either the limbus of the eye or the iris of the eye; and the whole ring is needed as the reference for determining the eye position.

Another eye tracking system using infrared light to illuminate the pupil of the eye has been announced by ISCAN, Inc. This system is described as using infrared light to illuminate the eye, with the system then retrieving positioning information to a variety of applications, as e.g. computer control through eye movement as well as for assisting the disabled patient.

Any of a number of techniques for locating objects can be readily adapted to locate the center of the eye. It has been found desirable to improve the effectiveness and accuracy of such localizing or position determining systems. That is, given an object locating system used in conjunction with an excimer laser system, it has been found desirable to provide means for enhancing the ability of such systems to accurately locate the center of the eye and also accurately aim of the pulsed excimer beam into the eye.

The disclosures of the aforementioned patents are incorporated herein in their entirety. While these devices fulfill their respective particular objectives and requirements, the prior art does not suggest the novel system for continuously and accurately monitoring or tracking the position and change of position of an object associated with the operational condition of a motor vehicle.

SUMMARY OF THE INVENTION

The present invention provides a system and method for instantly and continuously defining and monitoring an object associated with the operational condition of a motor vehicle.

One embodiment of the invention is directed to the system and method of instantly and continuously defining and monitoring the position of the object in association with the operation of a motor vehicle.

Another embodiment of the invention is directed to a system and method for the real time locating, scanning and tracking of the contour or silhouette of the object located in the vehicle and involved in the operation of said motor vehicle.

Furthermore, one embodiment of the invention provides real time monitoring of an operator of a motor vehicle by directly scanning and monitoring the eyes or pupils, face and upper torso of the operator of the motor vehicle so as to prevent a breakdown of the operational condition of a motor vehicle at the instance of a faulty, inept, or inattentive operation of said vehicle.

In accordance with the embodiment of the invention, the system and method serves to prevent faulty or inattentive operation of a motor vehicle by employing intelligent object tracking devices, capable of real time silhouette and eye pupil scanning, monitoring, tracking and real time computer-based image processing.

The invention also provides an instant operator monitoring system, comprising a contour definition device with a pupil position, location and determination device, which includes: a contour definition device mounted in a vehicle configured to generate an outline of the face/head of the operator of a motor vehicle; a pupil reflex determination device mounted in a vehicle configured to locate the presence of the pupils in a defined zone overlying the outline of the face/head of the operator of a motor vehicle; a device capable of real-time monitoring position of the outline of the face/head of the operator of a motor vehicle while the operator is seated in the operator seat with the engine motor running; a device capable of real-time monitoring of the position of the eye pupils of the operator of a motor vehicle while the operator is seated in the operator seat with the engine motor running; a device capable of real-time tracking of the position of the face/head of the operator of a motor vehicle while the operator is seated in the operator seat with the engine motor running; and a device capable of real-time tracking of the position of the pupils of the operator of a motor vehicle while the operator is seated in the operator seat with the engine motor running.

One advantageous aspect of the invention provides a scanning system that may be customized to the individual operator.

Another advantageous aspect of the invention provides a contour or silhouette monitor device that may function separately and/or independently from an eye pupil detecting or localizing device.

An embodiment of the invention provides a combination of devices capable of adjustingly scanning various normally functional positions, silhouettes or contours for defining a operator operating at different positions or locations in a motorized vehicle.

The system and method embodiments of the invention provide the capability for monitoring the operational condition of the motor vehicle such as a truck, a bus, a tractor, a crane, a 2- or 3-wheel conveyance, or a motorized water craft.

The system and method of the invention further provides the means whereby the operational condition is monitored by use of a scanning beam or scanning beams for locating and tracking the presence of the operator in the operator seat.

The system and method in one of the embodiments of the invention includes determining and monitoring whether the motor vehicle engine is running.

The system and method for preventing a breakdown in the operation of a motor vehicle provides embodiments wherein the scanning beam for the inventive position monitoring and tracking is generated in the form of: an infrared (IR) beam; radio frequency (Rf) beam; and an ultrasound beam.

A further embodiment of the invention provides a system and method wherein the silhouette of the operator is defined.

One specific embodiment of the invention, provides a definition of the operator's silhouette comprising defining the outline of the operator face/head.

The system and method of the invention provides the capability to store the operator silhouette in memory.

The system and method of the invention provides the capability to track the operator silhouette for motion or change of position.

The system and method of the invention provides the capability to track the operator silhouette for any change in its outline.

The system and method of the invention provides the capability to track the change of the silhouette outline in the form of any change in shape of the silhouette while tracked within a defined zone and any change in position of the silhouette (i.e. lateral, vertical, torsional or oblique) within a defined zone.

One other embodiment of invention provides a system and method wherein the defined zone comprises an area defined vertically, horizontally and axially within which an operator can safely operate the motor vehicle.

Another embodiment of the invention includes a system wherein the pupils are detected by scanning beam within the silhouette.

In this context, the embodiment of the invention may include a system wherein the eye pupils detected within the silhouette are stored in memory.

Furthermore, the embodiment of the invention may include a system wherein the pupils detected within the silhouette are tracked for the motion.

More specifically, the embodiment of the invention may include a system wherein the eye pupils detected within the operator silhouette are tracked for any change in its size, shape and/or definition.

The method according the invention provides a monitoring system, wherein the change of the size, shape and definition comprises any change in size of the pupils, any change in the shape of the pupils, and any change in position of the pupils such in a lateral, vertical, torsional or oblique direction.

The invention provides a capable embodiment of the instant operator monitoring system may serve as an imminent collision warning system (I.C.W.S.).

The disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

BRIEF DESCRIPTION OF THE DRAWINGS

The invention providing an instant operator monitoring system as claimed and/or described herein is described below in terms of exemplary embodiments. These exemplary embodiments are described in detail with reference to drawings, which are part of the description of the invention. These embodiments are non-limiting exemplary embodiments, in which like reference numerals represent similar structures throughout the several views of the drawings, and wherein:

FIG. 3 depicts a visualization flow diagram of a silhouette monitoring system, according to the present invention;

FIG. 4 depicts an exemplary functional block diagram of a silhouette monitoring system, according to the present invention;

FIG. 5 depicts an exemplary flow diagram of an embodiment defining the steps/processes involved in defining the silhouette and detecting the pupils within the defined zone.

DETAILED DESCRIPTION

Figure 1:
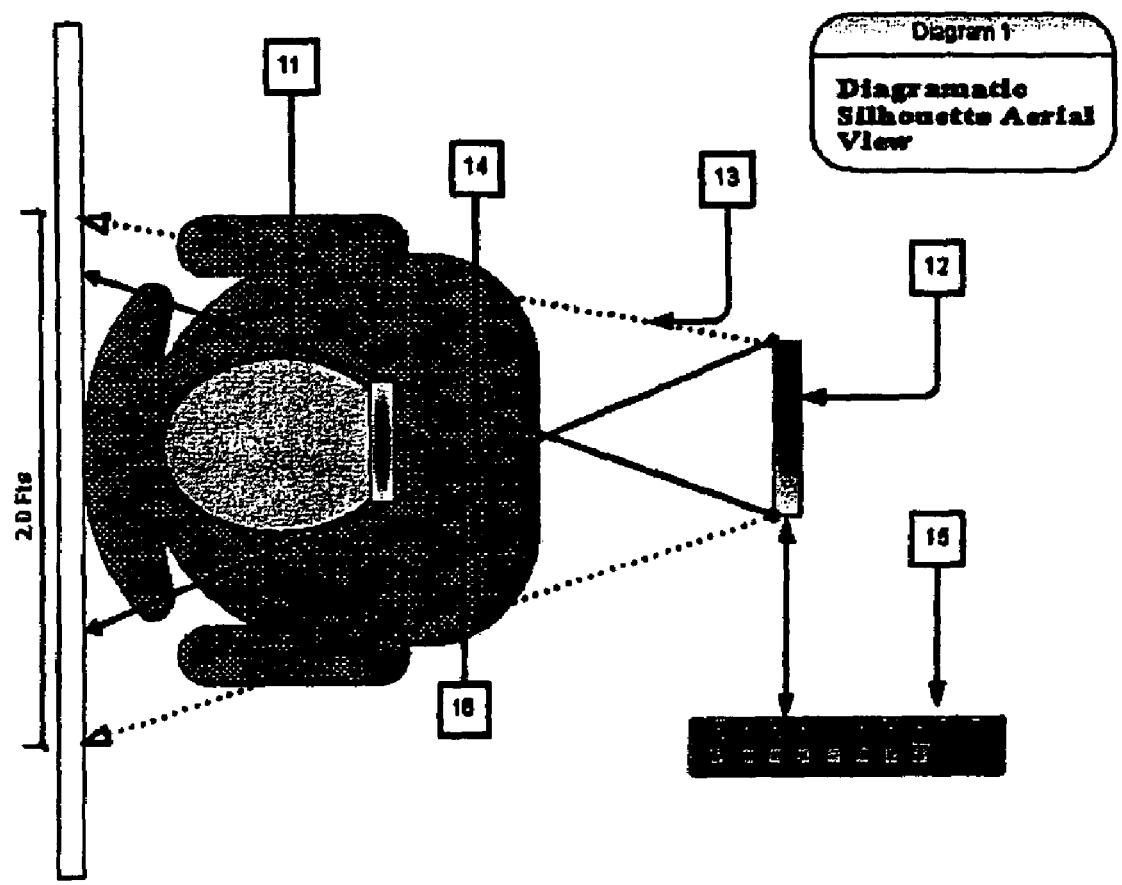
FIG. 1 depicts an exemplary aerial view diagram of a silhouette monitoring system, according to the present invention.

FIG. 1 illustrates an embodiment of the invention. The diagram depicts an exemplary aerial view of an operator 11 with an arrangement to ensure monitoring of the operational condition of the motor driven conveyance on land, water or air. The automatic monitoring system module 15 emits a range of source beam 13 around an area where the operator 11 of the motor vehicle is seated. In this embodiment as illustrated, the emitter 12 is installed in front (elevated position) of the operator. For example, the emitter may be installed on the visor frame of the motor vehicle. The source beam 14 is then transmitted towards the area around the head of the operator of the motor vehicle. The line 13 defines the imaginary boundary of the defined scan zone.

Figure 2:
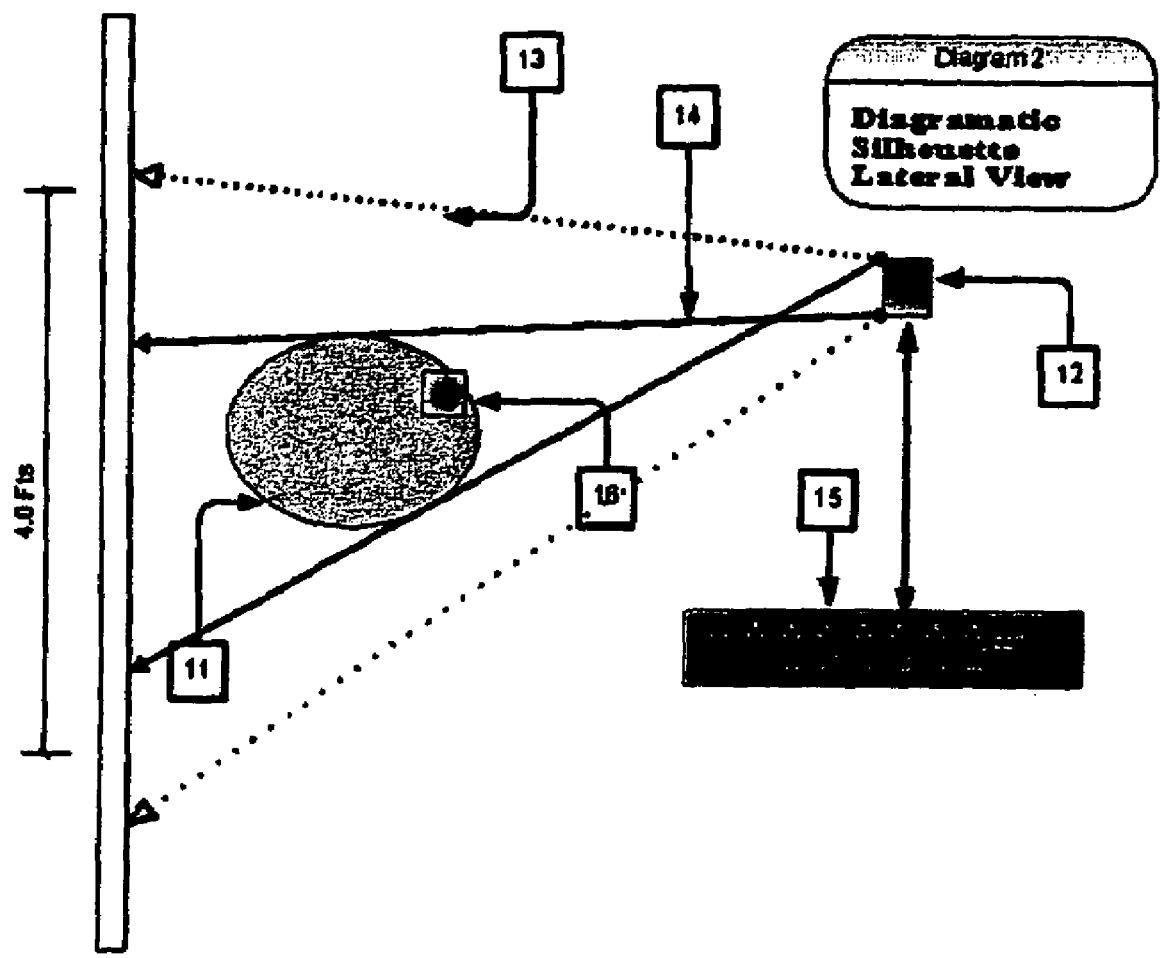
FIG. 2 depicts an exemplary lateral view diagram of a silhouette monitoring system, according to the present invention.

FIG. 2 illustrates the embodiment of the invention as in FIG. 1. The diagram depicts an exemplary lateral view of an operator 11 illustrating an arrangement designed to ensure continuous real time monitoring of the operational condition of the motor vehicle. The automatic monitoring system module 15 emits a range of source beams 13 around an area where the operator 11 of the motor vehicle is seated. In this embodiment as illustrated, the emitter 12 is installed in front (elevated position) of the operator. For example, the emitter may be installed on the visor frame of the motor vehicle. The source beam 14 is then transmitted towards the area defined or contoured around the operator of the motor vehicle, including the pupil or face 16. The line 13 defines an imaginary boundary of the defined scan zone.

The term motor vehicle in the context of the invention encompasses all kinds of motorized vehicles regardless of whether they are operated on land, underground, on water or in air, wherever the present system is applicable for monitoring the operator or driver of such vehicle or conveyance.

The source beam may correspond to an RF, ultrasound or an IrDA port, where the RF (radiofrequency) covers an area of about 3 blocks, the ultrasound covers an area of about 4 feet, and an "IrDA" type infrared system generally covers less than 5–10 feet with a proper line of sight. These technologies are described in greater detail below.

The IrDA specifications, in particular, are intended for high speed short range, line of sight, point-to-point cordless data transfer—suitable for handheld communication devices. Since 1984, "IrDA Data" defines a standard for an interoperable universal two-way infrared light transmission. IrDA technology is already in over 300 million electronic devices including PC's, PDA's, cellular phones, cameras, toys, watches and many other mobile devices. Main characteristics of IrDA signaling include:

- Range: Continuous operation between two contacts for at least 1 meter.
- Bi-directional communication is the basis of all specifications.
- Data transmission starting from 9600 kbps primary speed going up to 4.0 mbps.
- Data packets are protected using CRC (from CRC 16 for speeds up to 1.152 mbps to CRC-32 at 4.0 mbps).

Radio waves are created due to the movement of electrical charges in antennas. As they are created, these waves radiate away from the antenna. All electromagnetic waves travel at the speed of light. The major differences between the different types of waves are the distances covered by one cycle of the wave and the number of waves that pass a certain point during a set time period. The wavelength is the distance covered by one cycle of a wave. The frequency is the number of waves passing a given point in one second. For any electromagnetic wave, the wavelength multiplied by the frequency equals the speed of light. The frequency of an RF signal is usually expressed in units called hertz (Hz). One Hz equals one wave per second. One kilohertz (kHz) equals one thousand waves per second, one megahertz (MHz) equals one million waves per second, and one gigahertz (GHz) equals one billion waves per second.

RF energy includes waves with frequencies ranging from about 3000 waves per second (3 kHz) to 300 billion waves per second (300 GHz). Microwaves are a subset of radio waves that have frequencies ranging from around 300 million waves per second (300 MHz) to three billion waves per second (3 GHz).

Further taking reference to FIGS. 1 and 2, FIG. 3 depicts a visualization diagram of a monitoring embodiment according to the invention. Step 30—the source beam is activated. Step 31—the source beam scans for the face/head contour or silhouette. The silhouette scan is capable to generate 3D visual image by means of a source beam. The source beam 14 may be a combination of RF, Infrared, and Ultrasound technology. Step 32—the pupil determination is performed. Step 33—the three dimensional image of the scanned surface as defined and delineated by the monitoring module is generated on the parameters provided by the silhouette scan and pupil detection or determination. Step 34 on the base of baseline image generated in Step 33 the scanning, monitoring devices or modules and tracks any changes on occurring on real-time basis. Step 35—any sudden or dramatic change to the image, an appropriate audio/visual alert is broadcasted. In Step—36 upon successful acknowledgement, the system returns to the non-alarmed initial stage.

FIG. 4 depicts a systematic diagram of a scanning/monitoring system embodiment. The power to the monitoring module may be hardwired to conventional AC power lines, to solar panels, to low consumption batteries or a combination of any of these or other power sources. The power supply 49 adapters regulate and supplies the correct voltage to the system. The module has also a provision for secondary power, which can be easily interfaced, via a power interface 48.

The device has an onboard microprocessor 52 and is interconnected to the various sub-components such as power adapter 49 and output adapter 51 via a system bus 50. The system application 53 runs on the processor 52 and provides control and may be used to coordinate the functions of the various components of the system. The system application 53 is stored in ROM 56.1 and its sub-functionality can temporarily be made to run from the RAM 56.2 increasing the performance of overall system communication.

The presence of the operator near the monitor module 16 (FIG. 1 or 2) is sensed by a sensor beacon 60 which is connected to a vehicle. Upon successful acknowledgement of the presence of the operator 11 of the motor vehicle (not shown), the system initiates the communication.

ICWS is equipped with an impact/shock/sound/vibration sensor, which in case of vandalism, accident or in any other designated or emergency situation immediately emits the alert tone. The alert sensor 61 initiates the audio/video transmission based upon the critical information provided by the source beam sensor 58. All the processed information are logged and saved in the data storage area 57.

The source beam 58 is connected via beam emitter 59.1 and beam receiver 59.2. In addition to this, both pairs are also capable of producing real-time full motion images from any designated site.

The instant operator monitoring system has a multi-line LCD panel 55 connected via a display adapter 54, which is capable of displaying detailed information related to the motor vehicle The source beam sensor 58 differentiates between an incoming signal beam via a beam receiver 59.2 and outgoing beam via a beam emitter 59.1.

FIG. 5 is a flowchart of an exemplary process, in which the is monitoring, tracking and logging the information on real-time basis. In step 70.1, the instant operator monitoring system may initialize itself with the running of the engine motor. In Step 70.2 the instant operator monitoring system scan the mode of the vehicle. In Step 71.1 the sensor is activated and scans for the operator on the motor vehicle with engine motor running. Step 72.1 of the system goes to sleep mode if there is no activity detected within the defined zone.

In Step 73.1, the active silhouette system scans for the face/head outline and activates pupil determination module 74.1 on the real-time basis. Any significant changes or movements tracked within the silhouette or pupils, the alert 78.1 is activated. Simultaneously the real-time monitoring and tracking can be recorded on the local storage drive.

The instant operator monitoring system as described in the various embodiments set forth above, may be provided in the form of a plug-in or a portable module.

We claim:

1. A method as programmed in a vehicle-mounted contour definition device for real-time monitoring the operational condition of a motor vehicle comprising:

instantly and continuously defining, measuring and monitoring a contour or a silhouette of key features of an object associated with the operational condition of said motor vehicle when the motor is running; and, wherein the real-time monitoring of the object comprises directly scanning and monitoring key features defining the object in the form of eyes or pupils, face and upper torso of an operator of the motor vehicle and assessing any change of said eyes or pupils, pupil reflex, face/head and upper torso to prevent a breakdown of the operational condition of a motor vehicle.

2. The method of claim 1 further comprising: employing an intelligent object tracking device, capable of real time silhouette and eye pupil scanning, monitoring, tracking and real time computer-based image processing.

3. A system for monitoring the operational condition of a motor vehicle, comprising:
   a contour definition device mounted in a vehicle configured to generate an outline of a face/head of the operator of a motor vehicle;
   a pupil reflex determination device mounted in a vehicle configured to locate the presence of pupils in a defined zone overlying the outline of the face/head of the operator of a motor vehicle;
   a device capable of real-time monitoring position of the outline of the face/head of the operator of a motor vehicle while the operator is seated in the operator seat with the engine motor running;
   a device capable of real-time monitoring of the position of the pupils of the operator of a motor vehicle while the operator is seated in the operator seat with the engine motor running;
   a device capable of real-time tracking of the position of the face/head of the operator of a motor vehicle while the operator is seated in the operator seat with the engine motor running; and
   a device capable of real-time tracking of the position of the pupils of the operator of a motor vehicle while the operator is seated in the operator seat with the engine motor running.

4. The system of claim 3, wherein the motor vehicle comprises: a motor vehicle, a truck, a bus, a tractor, a crane, a 2-or 3-wheel conveyance, an airborne motorized transport, or a motorized water craft.

5. The system of claim 3, wherein the operational condition monitored is the presence of the operator in the operator seat.

6. The system of claim 3, wherein the condition monitored is whether the motor vehicle engine is running.

7. The system of claim , wherein the scanning beam comprises:
   an infrared beam:
   a radio frequency beam; and
   an ultrasound beam.

8. The system of claim 3, wherein the silhouette is defined as contours outlining an operator.

9. The system according to claim 3, wherein the definition of silhouette comprises the contour or outline of the face/head.

10. The system of claim 3, wherein the silhouette is stored in memory.

11. The system of claim 3, wherein the silhouette is tracked for the motion.

12. The system of claim 3, wherein the silhouette is tracked for any change in its contours.

13. The system according to claim 3, wherein the change of the outline comprises:
    any change in shape of the silhouette while tracked within a defined zone;
    any change in position of the silhouette (i. e. lateral, vertical, torsional or oblique) within a defined zone.

14. The system of claim 3, wherein the defined zone comprises:
    an area defined vertically, horizontally and axially within which an operator can safely operate the motor vehicle.

15. The system of claim 3, wherein the pupils are detected within the silhouette.

16. The system of claim 3, wherein the pupils detected within the silhouette are stored in memory.

17. The system of claim 3, wherein the pupils detected within the silhouette are tracked for the motion.

18. The system of claim 3, wherein the pupils detected within the silhouette are tracked for any change in size, shape and definition.

19. The system of claim 18, wherein the change of the size, shape and definition comprises:
    any change in size of the pupils;
    any change in the shape of the pupils; and
    any change in position of the pupils, i. e. lateral, vertical, torsional or oblique.

20. A computer-based programmed method for monitoring the operational condition of a vehicle employing an intelligent object tracking device in real-time, comprising the steps of:
    (i) generating a silhouette of a vehicle operator located in said vehicle;
    (ii) defining and scanning operator face/head and upper torso silhouette;
    (iii) locating pupils in a defined zone overlying the contours of the operator face/head and determine pupil reflex; and
    (iv) continuously and instantly monitoring and tracking the position of the pupils and face/head of said operator with the vehicle motor running.

* * * * *